United States Patent [19]

O'Neill

[11] 4,397,285
[45] Aug. 9, 1983

[54] CLOSED LOOP DIESEL ENGINE CONTROL

[75] Inventor: Cormac G. O'Neill, Walnut Creek, Calif.

[73] Assignee: Physics International Company, San Leandro, Calif.

[21] Appl. No.: 283,387

[22] Filed: Jul. 15, 1981

[51] Int. Cl.³ .......................................... F02M 59/20
[52] U.S. Cl. ....................................... 123/502; 123/425
[58] Field of Search ................ 123/501, 502, 425, 435

[56] References Cited

U.S. PATENT DOCUMENTS

| | | | |
|---|---|---|---|
| 3,875,912 | 4/1975 | Bullo | 123/425 |
| 3,910,724 | 10/1975 | Okamoto | 123/502 |
| 3,957,023 | 5/1976 | Peterson | 123/425 |
| 3,977,373 | 8/1976 | Sand | 123/425 |
| 3,983,855 | 10/1976 | Jarrett | 123/458 |
| 4,063,538 | 12/1977 | Powell et al. | 123/425 |
| 4,064,855 | 12/1977 | Johnson | 123/467 |
| 4,074,667 | 2/1978 | Skinner | 123/502 |
| 4,130,096 | 12/1978 | Ford | 123/425 |
| 4,342,302 | 8/1982 | Straubel et al. | 123/502 |

FOREIGN PATENT DOCUMENTS

55-46073  3/1980  Japan .................................. 123/502

Primary Examiner—Ira S. Lazarus
Assistant Examiner—Magdalen Moy
Attorney, Agent, or Firm—Robert R. Tipton

[57] ABSTRACT

A method and apparatus for achieving optimized efficiency combustion in a diesel internal combustion engine utilizes a cylinder pressure detector which measures peak cylinder pressure relative to crankshaft timing and compares it with a speed-load-timing map comprising several engine parameters including engine speed and engine load in order to compensate for various unknown combustion characteristics of the fuels to be used in compression ignition engines, and automatically adjusts fuel injection timing for optimum efficiency.

13 Claims, 8 Drawing Figures

CLOSED LOOP DIESEL ENGINE CONTROL

BACKGROUND OF THE PRIOR ART

This invention relates generally to fuel injection for diesel engines and in particular to timing of fuel injection systems for diesel engines.

A number of prior art devices utilize the measurement of peak cylinder pressure as a method of timing spark ignition of an internal combustion engine to achieve optimum engine output, reduction of emissions of oxides of nitrogen or control of the timing of combustion (particularly for spark ignition engines).

Some of these references go so far as to utilize additional engine parameters such as engine load and speed to adjust the timing so that peak cylinder pressure occurs at a pre-selected crankshaft angle.

In spark ignited internal combustion engines the timing of the ignition and combustion of vaporized fuel can be accurately controlled for the fuels used when using engine speed and engine load as parameters to adjust spark advance or retard. However, for diesel fueled engines, ignition delay, as determined by cetane number, is an added factor which must be considered.

SUMMARY OF THE INVENTION

The method of achieving optimized efficiency combustion in the apparatus and process of the present invention comprises, basically, the steps of continuously sensing peak cylinder pressure to generate a peak pressure signal varying according to crankshaft position, detecting the position of the peak cylinder pressure, for example, by differentiating the pressure signal to produce a control signal that changes from to positive to negative polarity when the pressure peak is reached, comparing the peak pressure timing with crankshaft timing and generating an actual crankshaft timing signal, continuously sensing engine speed and generating an engine speed signal, continuously sensing engine load and generating and engine load signal, comparing the engine speed signal with engine speed coordinates of an engine speed-load-timing map, comparing the engine load signal with the engine load coordinates of an engine speed-load-timing map, generating an optimum crankshaft timing signal in accordance with the timing coordinate at the intersection of load signal coordinate and the speed signal coordinate of the speed-load-timing map, comparing the actual crankshaft timing signal with the optimum crankshaft timing signal to generate a crankshaft timing error signal and adjusting the fuel injection timing to reduce the deviation between the actual crankshaft timing and optimum crankshaft timing signals to zero.

The apparatus for achieving optimized efficiency combustion comprises, basically, a means for detecting peak pressure inside the cylinder and producing a peak pressure signal proportional to the peak cylinder pressure, means for detecting the crankshaft position when peak cylinder pressure occurs can comprise, for example, means for differentiating a continuous pressure signal with respect to time and producing a differentiated pressure signal, means for detecting when the differentiated pressure signal reaches zero, means for measuring crankshaft timing relative to a reference position when said differential pressure signal reaches zero and producing an actual crankshaft elapsed time or crankshaft angle signal when said differential pressure signal reaches zero, means for measuring engine speed and producing an engine speed signal, means for measuring engine load and producing and engine load signal, means for comparing the engine speed and engine load signals with a speed-load-elapsed time (or crankshaft angle) map and producing an optimum crankshaft elapsed time (or crankshaft angle) signal, means for comparing said actual crankshaft elapsed time (or crankshaft angle) signal with said optimal crankshaft elapsed time (or crankshaft angle) signal and producing a time adjustment signal and means for adjusting the position of the fuel injection pump elapsed time (or crankshaft angle), using an electroexpansive actuated spill valve, in accordance with the elapsed time (or crankshaft angle) adjustment signal achieve optimized efficiency combustion.

It is, therefore, an object of the present invention to provide an apparatus for achieving optimized efficiency combustion in a diesel engine.

It is a further object of the present invention to measure peak cylinder pressure and adjust the injection timing of the diesel fuel to provide optimized efficiency combustion.

It is another object of the present invention to time the peak cylinder pressure relative to crankshaft position.

It is still another object of the present invention to measure engine speed and engine load and compare speed and load with a speed-load-timing map to determine optimum peak pressure timing.

It is still a further object of the present invention to compare actual peak pressure timing of the crankshaft position with optimum peak pressure elapsed time (or crankshaft angle) determined from a speed-load-elapsed time (or crankshaft angle) map and adjust fuel injection timing to provide optimum peak pressure timing relative to crankshaft position.

These and other objects of the present invention will become manifest upon study of the following detailed description when taken together with the drawings.

DESCRIPTION OF THE PREFERRED EMBODIMENT

The apparatus of the present invention is for use primarily on diesel engines may be required to operate on fuels that are not ideal for use in compression ignition engines which may include wide-cut gasoline, kerosine, jet fuel, diesel fuel with additions of ethanol or methanol, coal and shale derivatives.

The varying properties of these alternative fuels which affect combustion are cetane number (which is essentially a measure of ignition delay), calorific value, density, viscosity and volatility. While some of these properties can be sensed by various kinds of transducers, other properties that affect performance characteristics do not lend themselves readily to such measurement. Methanol and ethanol have very low cetane numbers and will depress the fuel cetane number in proportion to their percentage content in the mixture.

The apparatus and method of the present invention by-passes the necessity for determining each fuel property directly. The apparatus and method of the present invention measures the cylinder pressure and adjusts the fuel injection timing accordingly for the combustion end effect desired.

In particular, it is desirable to have a high combustion efficiency which can be achieved by obtaining optimized efficiency combustion of all the fuel, in other words, a true diesel in which all the fuel feed is released at or near top dead center and full expansion occurs from the entire heat input.

For high speed engines, such as for road transportation vehicles, this type of operation would lead to excessive pressures with concomitant stresses that would lead to rapid engine failure.

Conventionally, cylinder pressure is limited by injection scheduling to delay fuel burning and thus limit cylinder pressure to a predetermined value at the expense of efficiency.

For an optimized compromise between efficiency and durability the point at which the peak cylinder pressure occurs at a given speed and load is very nearly constant independently of the ignition delay of the fuel. To maintain the position of the peak cylinder pressure when operating on fuels with various ignition delays (cetane numbers) the injection timing must be altered. Also, if the combined density and calorific value gives a heating value per unit volume significantly different from diesel fuel, then the volume injected at the smoke limit (torque limit on a non-smoke limited engine) must be changed either to maintain power output or to limit peak cylinder pressure.

The apparatus of the present invention involves the use of a cylinder pressure detector or sensor to detect the position and magnitude of the peak cylinder combustion pressure. The position of the peak is ill determined by direct measurement, but may be more accurately established by the zero crossing of the derivative of this curve.

A circuit (illustrated in FIG. 5) is employed to store or retrieve the desired position for peak pressure which position is pre-programmed into the computer memories in the control circuit.

In addition, as engine speed and engine load varies, the timing of injection that will produce optimum efficiency varies. The interrelationship between speed, load and timing is determined by a three-dimensional graph or speed-load-timing map. On such a graph or map, speed is measured along an X-coordinate, load is measured along a Y-coordinate disposed perpendicular to the X-coordinate, and timing is measured along a vertical or Z-coordinate perpendicular to both the X- and Y-coordinates.

Such a three-dimensional relationship can be stored as a programmable matrix in an on-board computer. The data may be accessed by speed and load inputs, continuously monitored by sensors, to produce a desired injection timing output.

Figure 1:
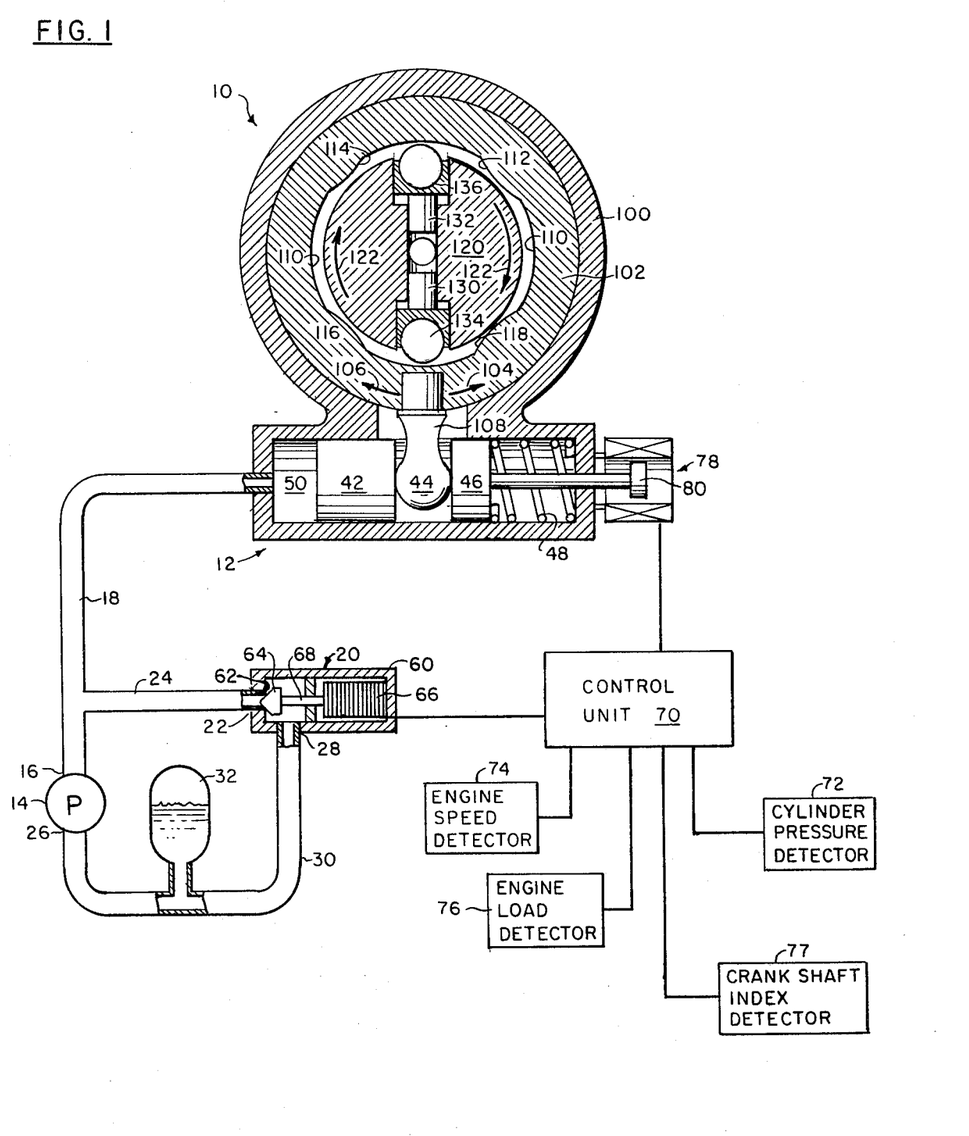
FIG. 1 is a schematic drawing of the control system of the present invention showing the method of adjusting the timing of fuel injection based on various engine parameters.

Therefore, with reference to FIG. 1, there is illustrated a schematic diagram of the apparatus for varying the fuel injection timing to compensate for the various combustion variables previously referred to.

The apparatus of FIG. 1 comprises, basically, a fuel injection pump 10 connected to an hydraulically operated advance-retard actuator 12. Fuel injection pump 10 is driven by the crankshaft of the engine (not shown).

The hydraulic system for operating advance-retard actuator 12 comprises, basically, an hydraulic pump 14 having its high pressure side 16 in fluid communication with advance-retard actuator 12 through conduit 18 and also in fluid communication with inlet side 20 of spill valve 22 through conduit 24.

The low pressure or inlet side 26 of pump 14 is also in fluid communication with outlet side 28 of spill valve 20 through conduit 30. An accumulator 32 is in fluid communication with conduit 30 to allow for expansion and contraction of the hydraulic fluid volume as more or less hydraulic fluid is conveyed to advance-retard actuator 12.

Advance-retard actuator 12 comprises, basically, an actuator cylinder 40 containing an actuator drive piston 42 in fluid communication with pump 14 through conduit 18. Actuator piston 42 is also adapted to engage one side of fuel injection pump advance-retard control arm bearing member 44.

Actuator cylinder 40 also contains actuator return piston 46 adapted to engage the other side of advance-retard control arm bearing member 44 and is biased in the direction of bearing member 44 by spring member 48. Thus, spring member 48 urges return piston 46 to bear against advance-retard bearing member 44, which, in turn, applies a force to drive piston 42 in a direction to create a positive pressure against the hydraulic fluid in chamber 50 at the end of actuator cylinder 40.

Controlling the pressure of fluid flowing to cylinder 40, spill valve 20 comprises, basically, a valve housing 60 having an inlet, end 22 and containing a valve seat 62 which is adapted to engage a valve plug 64 which, in turn is connected to electroexpansive or piezoelectric stack 66 by valve stem 68.

Electroexpansive or piezoelectric stack 66 is electrically connected to control unit 70 which provides the necessary output signal to vary the flow of fluid through spill valve 20.

At one end of advance-retard actuator 12 is actuator position sensor 78 which is shown as an electromagnetic detection device. Sensor 78 comprises a movable sensor member 80 connected to actuator return piston 46 by stem 82. Although actuator sensor 78 is shown as an electromagnetic type of device, it can also be of any other type of position sensor common in the art.

Figure 2A:
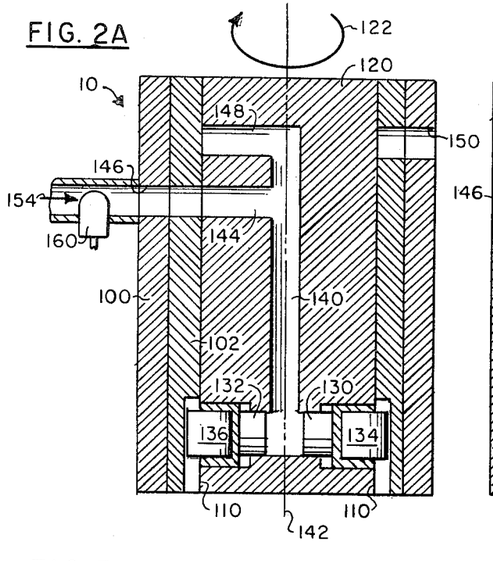
FIGS. 2A and 2B are elevational, cross-sectional views of the typical fuel injection and timing pump shown in a cross-sectional end view in FIG. 1.
Figure 2B:
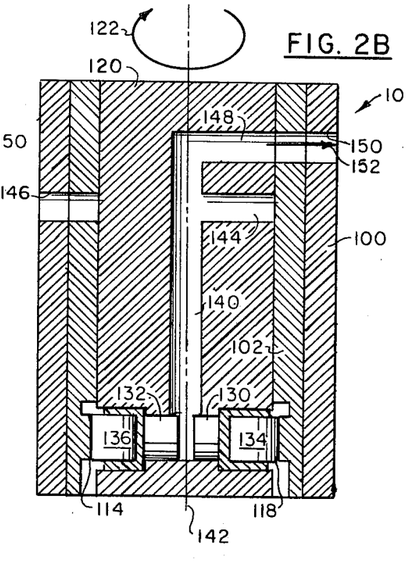

With reference to FIGS. 2A and 2B, as well as FIG. 1, fuel injection pump 10 comprises, basically, an outer fixed housing 100 containing an advance-retard control ring 102 adapted to rotate inside housing 100 in either a counterclockwise direction, as shown by arrow 104, or a clockwise direction, as shown by arrow 106. Connected to advance-retard control ring 102 by advance-retard control arm 108 is advance-retard control arm bearing member 44.

Along the inside surface 110 of advance-retard control ring 102 are four advance-retard control ring cams 112, 114, 116 and 118. Under standard practice, pump rotor 120 rotates at one-half engine crankshaft speed. For a common four cylinder diesel engine, pump 20 would, therefore, provide fuel to only two of the four cylinders of the engine in one revolution of the crankshaft inside ring 110.

Concentric within advance-retard control ring 102 is fuel injection pump rotor 120 which is driven, as noted previously, at one-half crankshaft by the engine crankshaft speed by engine crankshaft (not shown) and rotates continuously in the direction of arrows 122.

Fuel injection pump rotor 120 comprises a pair of fuel pump pistons 130 and 132 each connected, respectively, to fuel injection pump piston roller cam followers 134 and 136.

It will be noted that, as shown in FIG. 2A, piston roller cam followers 134 and 136 are also adapted to engage and bear against inside surface 110 of advance-retard control ring 102.

Fuel injection pump pistons 130 and 132 are arranged to be in fluid communication with fuel injection pump rotor central fuel channel 140 extending along and coincident with rotor axis of rotation 142.

As shown in FIG. 2A, central fuel channel 140 is in fluid communication with fuel injection pump rotor inlet channel 144 which is also in fluid communication with fuel pump fuel inlet port 146 for receiving fuel prior to compression and injection in the engine (not shown).

As shown in FIG. 2B, central fuel channel 140 is also in fluid communication with fuel injection pump fuel outlet channel 148 which is also in fluid communication with fuel pump fuel outlet port 150 at the appropriate time for injecting the fuel into the engine cylinder (not shown).

It will also be noted that, as shown in FIG. 2B, piston roller cam followers 134 and 136 are now engaging advance-retard control ring cams 118 and 114, respectively. Thus piston roller cam followers 134 and 136, and pistons 130 and 132, respectively, are forced toward each other to compress the fuel into central channel 140 and out through outlet channel 148 and fuel outlet port 150, as shown by arrow 152.

In FIG. 2A, fuel being pumped from the fuel tank or reservoir (not shown) will enter inlet port 146, as indicated by arrow 154, forcing the fluid fuel past metering control valve 160 into inlet channel 144 and central fuel channel 140 to apply hydraulic pressure to pistons 130 and 132. The pressure applied to pistons 130 and 132 augments the centrifugal force of rotation to urge roller followers 134 and 136, respectively, to bear against inside surface 110 of advance-retard control ring 102.

Figure 5:
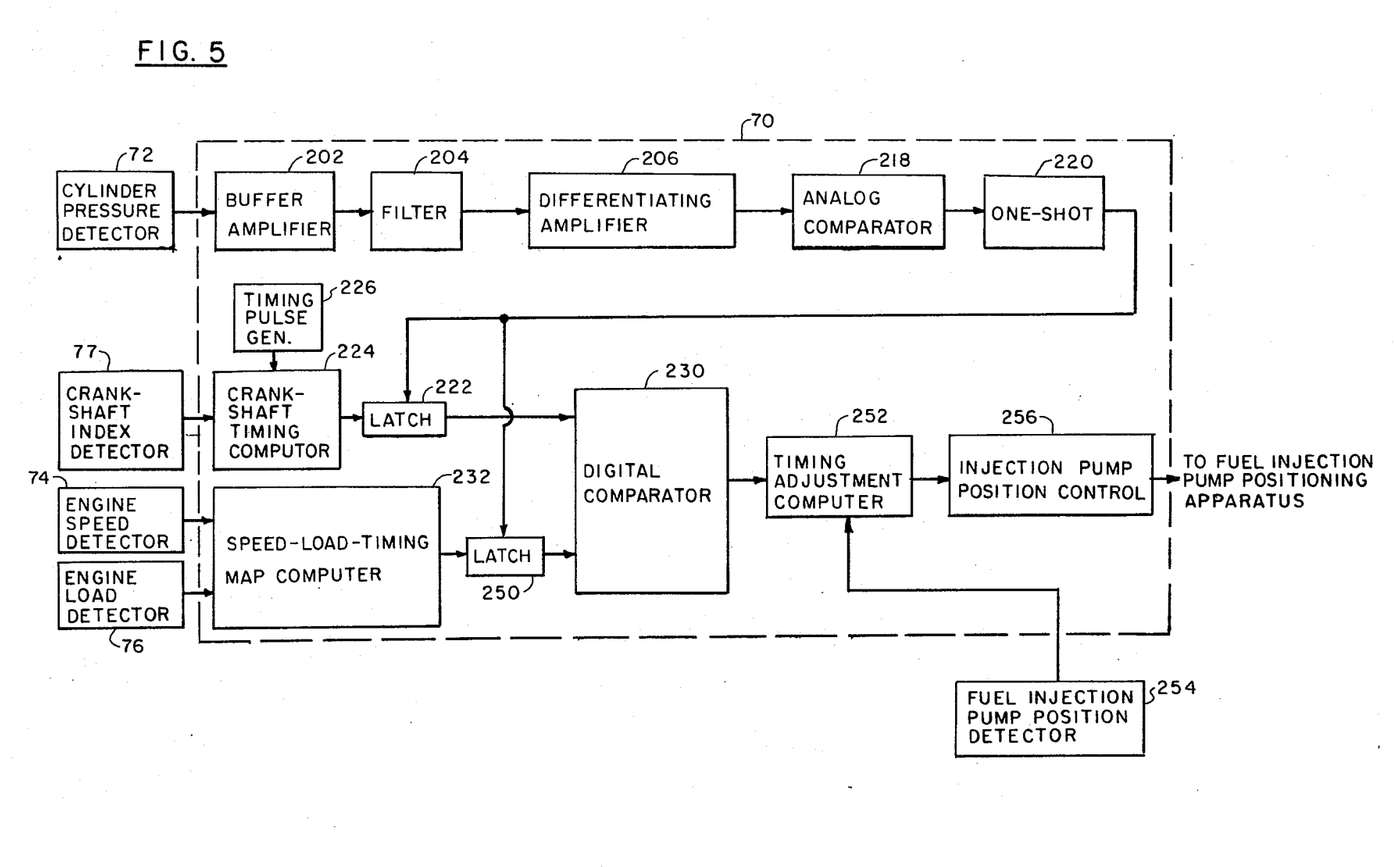
FIG. 5 is a block diagram of the control unit circuit shown in FIG. 1 which is used to control the fuel injection timing actuator.

To control expansion and contraction of electroexpansive or piezoelectric stack 66 of spill valve 20, a central control unit 70, illustrated in FIG. 5 is used.

Control unit 70 comprises, basically, a buffer amplifier 202 for receiving the pressure signal from cylinder pressure detector 70, a filter 204 to isolate the buffered pressure signal from buffer amplifier 204, and a differentiating amplifier 206 that differentiates the pressure signal from filter 204.

Engine load detector 76 is adapted to measure engine load as represented by the quantity of fuel that is actually being injected into the cylinders at a specific moment. For an electronically controlled injection system, this signal corresponds directly to output signal of the electronic injection system. For a mechanical (non-electronic) fuel injection system, fuel volume can be monitored by a position transducer on the fuel rack whose output will be directly proportional to fuel volume. Therefore, as used in this context, "engine load" is synonymous with "engine fuel demand".

The use of engine fuel demand as the determiner of load, however, does not rule out the use of devices such as torque transducers connected to the engine crankshaft as a means for generating an engine load signal.

Figure 3:
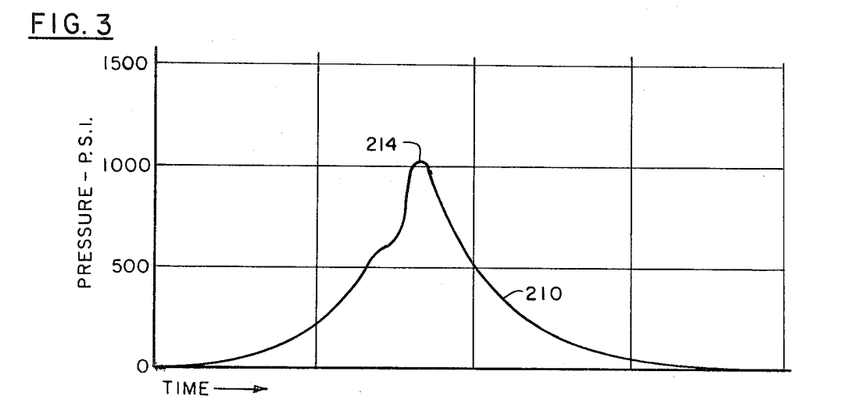
FIG. 3 is a typical time-pressure graph of cylinder pressure during combustion of diesel fuel in one cylinder of a diesel engine.
Figure 4:
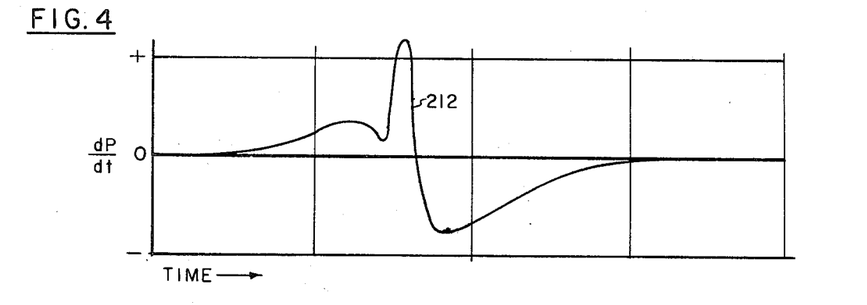
FIG. 4 is a graph of the mathematical derivative with respect to time of the cylinder pressure-time curve of FIG. 3.

The typical pressure-time signal curve 210 for a diesel combustion cycle is illustrated in FIG. 3. Curve 212 of FIG. 4 illustrates the mathematical differentiation of the cylinder head pressure signal curve 210 of FIG. 3. At the point of peak cylinder pressure 214, curve 212 of FIG. 4 crosses from positive to negative polarity.

Various circuits which can perform this differentiation function are well known and common in the art. For example, a transistorized capacitor circuit can be used in which rising and falling voltages create plus and minus output voltages, whereas, voltages that do not fluctuate produce a zero voltage output.

Again, with reference to FIG. 5, the output signal, i.e., the differentiated pressure signal, produced by differentiating amplifier 216, is analyzed by analog comparator 218 which generates a peak cylinder pressure signal to actuate one-shot pulse generator 220.

The peak cylinder pressure signal from one-shot pulse generator 220 is used to operate latch or gate 222.

Latch or gate 222 is also adapted to receive a crankshaft timing signal from crankshaft timing computer 224.

To generate the crankshaft elapsed time signal, crankshaft index detector 77 is connected to the engine crankshaft (not shown) which is provided with an index cam, such as a gear, sprocket or the like. Each time the crankshaft rotates, a pulse or crankshaft index signal is sent to crankshaft timing computer 224.

A timing pulse generator 226 is also connected to crankshaft timing computer 224 to provide a fixed frequency of pulses. Thus, for any given speed of the crankshaft, the number of timing pulses following the crankshaft index pulse will determine the instantaneous angle of crankshaft rotation for that speed. It must be pointed out that the crankshaft indexing cam does not have to be located at a particular position or angle relative to piston position. Compensation for indexing cam location can be taken care of by the multiplication of elapsed time coordinates of the speed-load-timing map (FIG. 6) by a constant. It must also be pointed out that for a fixed frequency of timing pulses, the angle of rotation of the crankshaft per timing pulse will vary depending upon the engine crankshaft speed.

If a constant crankshaft angle per timing pulse were desired for any crankshaft speed, then timing pulse generator 226 must be connected to the flywheel gear (not shown) or other moving engine part such that the timing pulses vary in frequency directly directly proportional to engine crankshaft speed.

In the embodiment of the present invention, either method of timing may be employed, however, the speed-load-timing map must be coordinated with the method used, whether by elapsed time alone or by angular position of the crankshaft.

The actual peak pressure elapsed time signal (or crankshaft angle signal) is then transmitted to digital computer 230 when peak cylinder pressure is reached.

Figure 6:
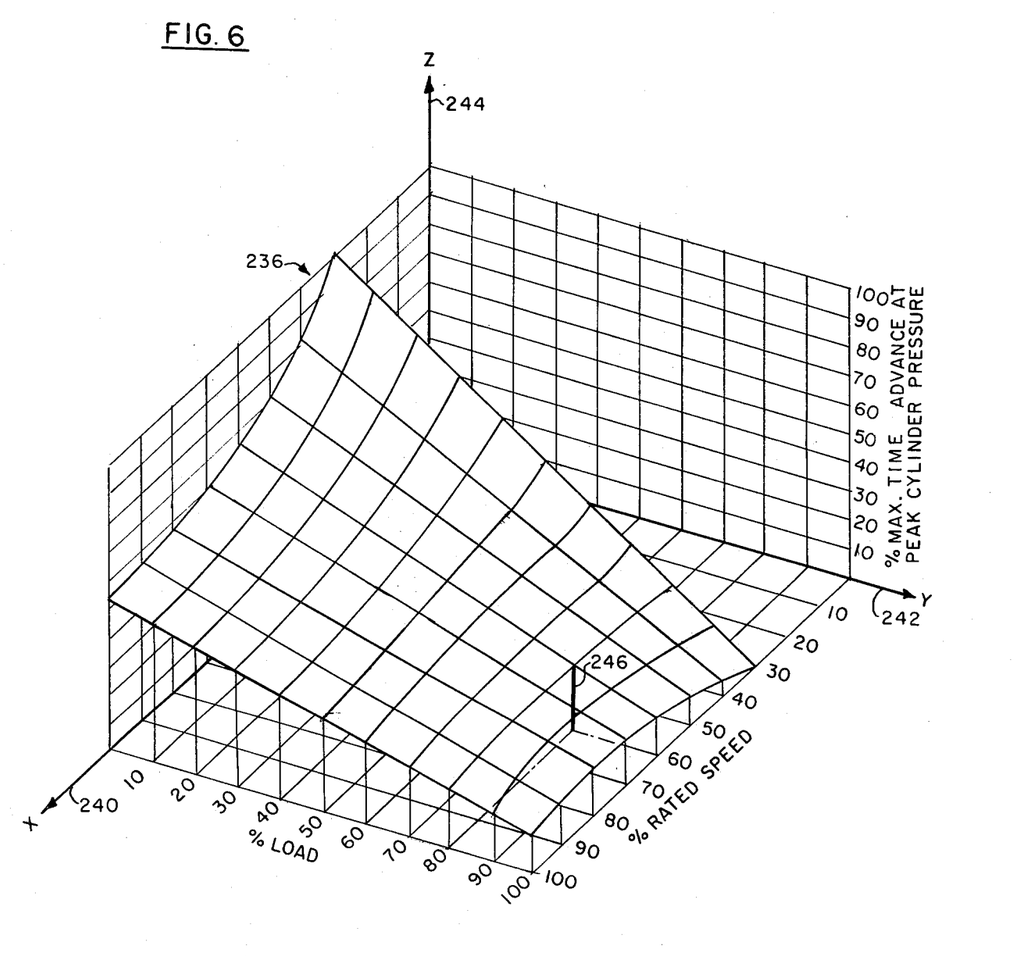
FIG. 6 is a typical three-dimensional graph illustrating a load-speed-elapsed time map used for determining optimum elapsed time between a reference position of the crankshaft and the instant of injection starting time in a diesel engine.

To obtain the optimum peak cylinder pressure elapsed time, the engine speed signal is transmitted from engine speed detector 74 to speed-load-elapsed time map computer 232 (identified in FIG. 6 as speed-load-timing map computer 232). The engine load signal is also transmitted to speed-load-elapsed time map computer 232 from engine load detector 76.

It must be pointed out that speed-load-timing map computer 232 of FIG. 6 can be used for either computing elapsed time or timing in terms of degrees of crankshaft angle. When used for computing elapsed time, it will be referred to as "speed-load-elapsed time map computer 232".

Speed-load-elapsed time map computer 232 is adapted to receive engine speed and engine load signals and compare each signal, respectively, with the desired elapsed time at those speed and load coordinates of a speed-load-elapsed time map stored in the memory of speed-load-elapsed time map computer 232. Such a speed-load-elapsed time map 236 is graphically illustrated in FIG. 6.

With particular reference to FIG. 6, an isometric view of a typical three-dimensional speed-load-elapsed time map 236 is illustrated in which engine speed is measured along the X-axis 240, the engine load is measured along Y-axis 242, and the optimum elapsed time value of peak cylinder pressure is measured along the Z-axis 244.

The optimum elapsed time value, represented in percent of maximum time advance, is measured by the height of the time coordinate at the intersection of the particular X- and Y-coordinate.

For example, the optimum elapsed time of fuel combustion for a crankshaft speed of, say, 60% of rated speed and a load of, say, 80% of load, is the value of vertical coordinate 246 at the intersection of the X- and Y-coordinates representing those particular speed and load values. Thus, when fuel injection timing is adjusted such that the peak cylinder combustion pressure occurs at the particular elapsed time given by the height of time coordinate 246, after detecting the crankshaft index point detection by crankshaft index detector 77, optimized efficiency combustion will occur. In other words, the most efficient engine performance will be achieved.

As can be seen from speed-load-elapsed time map 236, for a given engine speed, advance timing of the fuel injection will have to be decreased (retarded) simultaneously to retard peak cylinder pressure as engine load increases. That is, the elapsed time curve along the particular speed, or X-coordinate slopes downwardly or decreases with increase in load.

As can be seen from the speed-load-elapsed time map 236, given by way of example for a particular engine for a given engine load below 80% of load, advance time of the fuel injection will have to decrease as engine speed increases. That is, the elapsed time curve along a particular load, or Y-coordinate slopes downwardly or decreases with increase in engine speed.

The optimum peak pressure elapsed time signal generated by speed-load-elapsed time map computer 235 from speed-load-elapsed time map 236 stored in its memory, is continuously received by latch or gate 250.

At peak cylinder pressure, latch or gate 250 is actuated by the pulse from one-shot pulse generator 220. The optimum peak pressure elapsed time signal is released from latch or gate 250 and transmitted to digital computer 230. In digital comparator 230 the actual and optimum peak pressure time signals are compared and a peak pressure timing difference signal is generated and transmitted to time adjustment computer 252.

Time adjustment computer 252 is also adapted to receive the fuel injection pump position signal from start of injection position detector 254. Detector 254 receives its signal from position sensor 78 that tracks the movement of cam ring 110 as previously described. Consequently, time adjustment computer 252 receives a time error signal and an angular position signal representing actual start of injection. Computer 252 passes signals to pump timing controller 256 to reduce the time error to zero at a rate determined by the magnitude of the angular error. Pump position controller 256 either increases or decreases the voltage being applied to piezoelectric stack 66 of spill valve 20 to either increase or decrease the flow of fluid through spill valve 20 which, as a result, either decreases or increases the hydraulic pressure against drive piston 42 of advance-retard actuator 12.

In the event timing pulse generator 226 is adapted to generate pulses which vary in frequency directly proportional to crankshaft speed, then the scale of timing along the Z-axis can be changed to degrees of crankshaft rotation from the crankshaft index mark on cam relative to peak cylinder pressure pulse. Such a curve or map is shown in FIG. 7.

Figure 7:
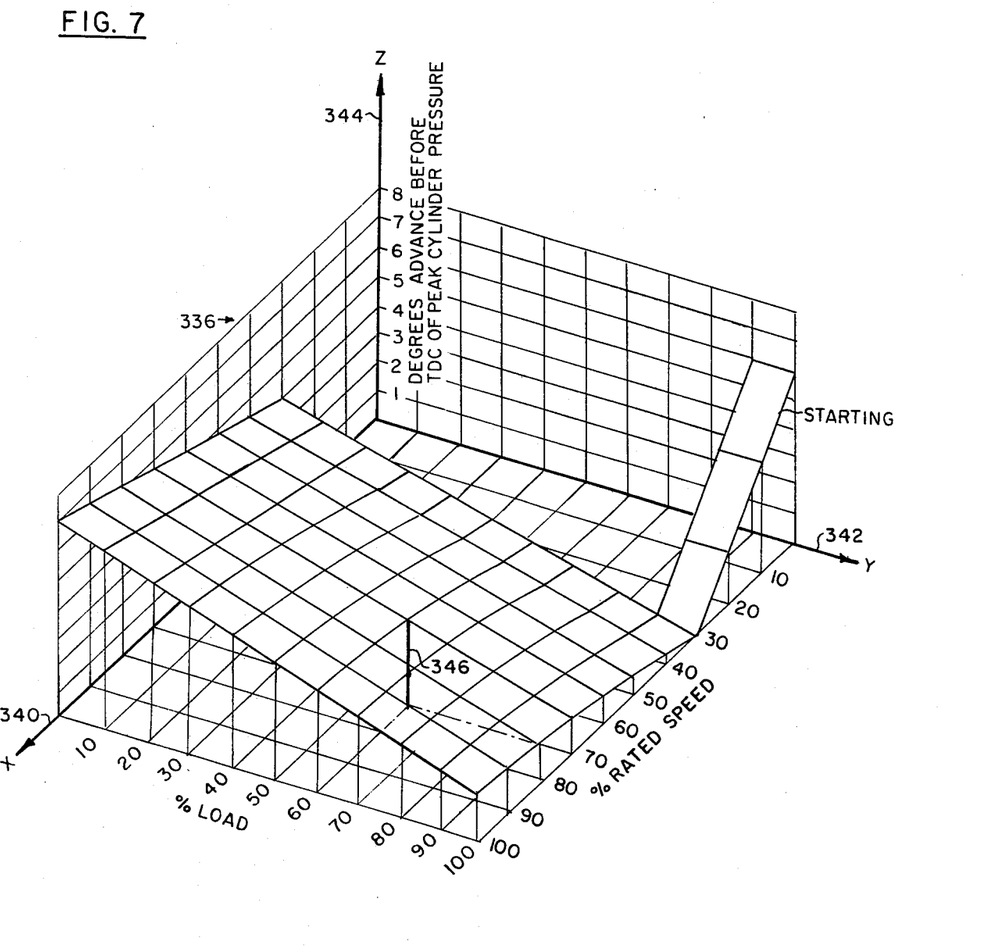
FIG. 7 is a typical three-dimensional graph illustrating a speed-load-crankshaft angle map used for determining optimum crankshaft angle for the start of injection in a diesel engine.

With reference to FIG. 7, there is illustrated another isometric view of a speed-load-crankshaft angle map 336 in which peak cylinder pressure timing is calibrated in angular degrees advance of crankshaft index point. This index point can be the Top Dead Center (TDC) position of the piston.

In speed-load-crankshaft angle map 336, engine speed is measured along speed or X-axis 340, the engine load is measured along load or Y-axis 342 and the optimum advance of peak cylinder pressure in angular degrees is measured along advance angle or Z-axis 344.

The optimum crankshaft angle, represented in degrees advance, is measured by the height of the timing coordinate at the intersection of the particular X- and Y-axis coordinates.

For example, the optimum angle of crankshaft position for fuel combustion to take place at a speed of, say, 70% of rated speed and a load of, say, 60% of load, is the value of the vertical coordinate 346 at the intersection of the X- and Y-axis coordinates represented by those particular speed and load values.

Thus, when fuel injection timing is adjusted such that peak cylinder combustion pressure occurs at the particular crankshaft angle given by the height of timing coordinate 346, optimized efficiency combustion will occur.

As can be seen for speed-load-crankshaft angle map 336, for a given engine speed, the timing angle of the crankshaft will have to be decreased (retarded) from maximum degrees advance as load increases. That is, the timing curve along the particular speed, or X-axis coordinate, slopes downwardly, or decreases with increase in load.

As can be seen from speed-load-timing map 336, for a given engine load, the timing angle of the crankshaft will have to be increased (advanced) as engine speed increases. That is, the timing curve along a particular load, or X-axis coordinate, slopes upwardly or increases with increase in engine speed.

Both speed-load-timing maps 236 and 336 represent timing (either in elapsed time or angular degrees of crankshaft rotation) of optimum peak cylinder pressure relative to crankshaft index point. In speed-load-elapsed time map 236, timing is represented by crankshaft time to peak cylinder pressure from a crankshaft index point. In speed-load-timing map 336, timing is represented by crankshaft angle of peak cylinder pressure relative to crankshaft index point.

Either speed-load-elapsed time map 236 or speed-load-crankshaft angle map 336 can be stored in the memory of speed-load-timing map computer 232. Or for that matter, any other speed-load-timing map can be stored in the memory of speed-load-timing map computer 232 depending upon the operating parameters of a particular diesel engine, such as one provided with a supercharger or equipped with other auxiliary equipment which might change the relationship of speed to load to timing of fuel injection.

In all cases, however, the method used for measuring injection delay, whether by time lapse from a crankshaft index point or by crankshaft angle from a crankshaft index point, must be coordinated with the particular speed-load-timing map timing axis calibration.

To operate the closed loop diesel engine control system of the present invention, the diesel engine for which the present invention is adapted is started and placed under a load.

As the engine (not shown) runs, fuel injection pump rotor 120 is caused to rotate in the direction of arrows 122 (FIG. 1). As rotor 120 rotates within fuel injection pump advance-retard control ring 102, roller cam follower members 134 and 136 will be caused to alternately engage the inside surface 110 of advance-retard control ring 102 and cams 112, 118, 116 and 114, angularly spaced apart along the inner surface 110 of advance-retard control ring 102.

As roller cam followers 134 and 136 engage cams 112, 118, 116 and 114 pump pistons 130 and 132, respectively, will be caused to alternately move toward and away from each other, alternately permitting fuel to enter pump 10 through inlet port 146, fuel inlet channel 144 and central fuel channel 140 and exhaust through fuel outlet channel 148 and fuel exit port 150. As roller cam followers 134 and 136 engage, for example, cams 114 and 118, fuel is then pumped out of fuel injection pump 10 from central channel 140, through fuel outlet channel 148 and out through outlet port 150 to the appropriate cylinder of the engine (not shown).

It will be noted that fuel injection pump rotor 120 is geared to the crankshaft of the diesel engine so that its rotary angular position is fixed relative to crankshaft angular position.

Since advance-retard control ring 102 can be rotated relative to fixed housing 100, the angular position of cams 112, 114, 116 and 118 can be adjusted by moving advance-retard control arm 108 and end bearing 44 either clockwise, as indicated by arrow 106, or counter-clockwise, as indicated by arrow 104. Thus, the timing of fuel injection relative to crankshaft angle can be advanced (by rotating control arm 102 in the direction of arrow 104) or retarded (by rotating control arm 102 in the direction of arrow 106) as required, depending upon the delay time for the fuel ignition based on cetane number or other fuel parameters.

As cylinder presssure is detected by cylinder pressure detector 72, engine speed and engine load are simultaneously measured by engine speed detector 74 and engine load detector 76. Concurrently, crankshaft timing computer 224 measures the number of pulses generated by timing pulse generator 226 after the crank shaft index cam or mark is detected by crankshaft index detector 77.

Using engine speed and engine load signals from engine speed detector 74 and engine load detector 76, respectively, speed-load-timing map computer 232 matches engine speed with the appropriate coordinate along engine speed or X-axis 240 of speed-load-elapsed time map 236 (FIG. 6) and engine load with the appropriate coordinate along load or Y-axis 242 of speed-load-timing map 236.

Since engine speed and load will continuously vary, the scanning of speed, or X-axis coordinates and load, or Y-axis coordinates, coordinates of speed-load-elapsed time map 236 by computer 232 will be a continuous operation. In the apparatus and process of the present invention there is no "fixed" optimum timing angle of the crankshaft.

As soon as peak cylinder pressure is detected by differentiating amplifier 206, and, in combination with analog comparator 218, the peak cylinder pressure signal from analog comparator 218 and one-shot pulse generator 220 will simultaneously unlatch or open latches or gates 222 and 250 to allow the actual crankshaft timing signal and the optimum crankshaft timing signal to be simultaneously transmitted from crankshaft timing computer 224 and speed-load-timing computer 232, respectively, to digital comparator 230.

If the actual crankshaft elapsed time (or crankshaft angle for speed-load-crankshaft angle map 336) signal and the optimum crankshaft elapsed time (crankshaft angle for speed-load-crankshaft angle map 336) signal are different, a timing difference signal will be transmitted to timing adjustment computer 252 where a crankshaft timing error signal for peak cylinder pressure is generated. Based upon the error signal received by injection pump position control 256, the voltage across piezoelectric stack 66 is either increased or decreased. A decrease in voltage across piezoelectric stack 66 will cause the stack to contract thus increasing the spacing between valve seat 62 and valve plug 64. As the voltage is decreased, more hydraulic fluid from hydraulic pump 14 will be caused to flow, or spill, from conduit 24 to conduit 30 thereby reducing the hydraulic pressure on the high pressure side 16 of pump 14 and in conduit 18.

As the pressure in conduit 18 is reduced, pressure in cavity 50 will also be reduced causing drive piston 42 to move to the left as a result of the bias pressure from spring 48 against return piston 46 and control arm bearing 44.

Thus, leftward movement of drive piston 42 and control arm bearing 44 connected to control arm 108 will cause fuel injection pump advance-retard control ring 102 to rotate clockwise in the direction of arrow 106.

Since fuel injection pump rotor 120 is rotating in a clockwise direction, the timing of fuel injection will be retarded relative to prior injection timing.

Movement in the direction of arrow 106 should, therefore, then re-establish the position of the peak cylinder pressure to compensate for the change in fuel characteristics or engine parameters.

As the volume of hydraulic fluid decreases in cavity 50, a like amount of hydraulic fluid will enter accumulator 32.

In a like manner, if the voltage across piezoelectric stack 66 is increased, piezoelectric stack 66 will expand causing valve plug 64 to move toward valve seat 62 to close and restrict the flow of hydraulic fluid through spill valve 20. As the flow of fluid through conduits 24 and 30 is restricted, the pressure of hydraulic fluid in conduit 18 and cavity 50 will increase causing drive piston 42 to bear against control arm bearing 44 connected to control arm 108 and move advance-retard control ring 102 in a counter-clockwise direction.

Since fuel injection pump rotor 120 is rotating in a clockwise direction, the timing of fuel injection will be advanced in relation to prior timing.

Thus is disclosed an apparatus and process for maintaining optimized efficiency combustion of fuel in a diesel engine.

I claim:

1. In a diesel internal combustion engine comprising
means defining a cylinder having a cylinder head,
a piston disposed in said cylinder and adapted to move toward and away from said cylinder head,
a crankshaft connected to said piston and driving a load,
a fuel injection system connected to said cylinder and having a fuel injection pump,
the improvement comprising
means for detecting peak cylinder pressure inside of said cylinder and generating a peak cylinder pressure signal,
means for measuring the speed of said crankshaft and generating a speed signal proportional to said crankshaft speed,
means for measuring said load on said engine and generating a load signal proportional to said engine load,
means for measuring crankshaft timing relative to peak cylinder pressure and generating an actual crankshaft timing signal,
a speed-load-timing map having a speed axis, a load axis and a timing axis,
means for continuously comparing crankshaft speed with said speed axis of said speed-load-timing map,
means for continuously comparing engine load with said engine load axis of said speed-load-timing map,
means for measuring a timing value along said timing axis of said speed-load-timing map according to the value represented at the intersection of speed and load coordinate values and generating an optimum crankshaft timing signal,
means for comparing said actual crankshaft timing signal and said optimum crankshaft timing signal and generating a crankshaft timing difference signal, and
means for adjusting the timing of said fuel injection based on said crankshaft timing difference signal to reduce said difference signal to zero and achieve optimized efficiency combustion.

2. The apparatus as claimed in claim 1 in which
said actual crankshaft timing signal is measured in angular degrees of crankshaft rotation, and
said optimum crankshaft timing signal is measured in angular degrees of crankshaft rotation.

3. In a diesel internal combustion engine comprising
means defining a cylinder having a cylinder head,
a piston disposed in said cylinder and adapted to slidably move toward and away from said cylinder,
a crankshaft connected to said piston and driving a load,
a fuel injection system connected to said cylinder and having a fuel injection pump having a means for advancing and retarding the injection of fuel,
the improvement comprising
an actuator for varying the timing of fuel injection into said cylinder connected to said fuel injection pump advance-retard means, said actuator comprising
an hydraulic cylinder and piston connected to said advance-retard means and adapted to move said advance-retard means,
an hydraulic pump having a high pressure side and a low pressure side, said high pressure side of said hydraulic pump in fluid communication with said hydraulic cylinder and piston,
a spill valve having a high pressure side and a low pressure side, said high pressure side of said spill valve in fluid communication with said high pressure side of said hydraulic pump and said low pressure side of said spill valve in fluid communication with said low pressure side of said hydraulic pump, and
means for actuating said spill valve comprising
means for detecting peak cylinder pressure inside said cylinder and generating a peak cylinder pressure signal,
means for measuring speed of said crankshaft and generating an output signal proportional to crankshaft speed,
means for measuring said engine load and generating an output load signal proportional to engine load,
means for measuring crankshaft position relative to peak cylinder pressure and generating an actual crankshaft position signal,
means for generating a desired optimum crankshaft position signal for said crankshaft speed, engine load,
means for comparing said optimum crankshaft position signal with said actual crankshaft position signal and generating a crankshaft position difference signal, and
means for actuating said spill valve to reduce said crankshaft difference to zero in order to achieve optimized efficiency combustion.

4. The apparatus as claimed in claim 3 wherein said means for comparing said crankshaft speed, engine load and actual crankshaft position and actuating said spill valve comprises
a speed-load-timing map having a crankshaft speed axis, an engine load axis and a timing axis,
means for continuously comparing crankshaft speed with said crankshaft speed axis of said speed-load-timing map,
means for continuously comparing engine load with said load axis of said speed-load-timing map,
means for measuring a time value along said timing axis of said speed-load-timing map according to the value represented at the intersection of an instantaneous speed axis coordinate and engine load axis coordinate and generating an optimum crankshaft timing signal,
means for comparing said actual crankshaft position signal with said optimum crankshaft position signal and generating a crankshaft position difference signal, and means for actuating said spill valve to reduce said crankshaft position difference signal to zero.

5. In a diesel internal combustion engine comprising
means defining a cylinder having a cylinder head,
a piston disposed in said cylinder and adapted to slidably move toward and away from said cylinder,
a crankshaft connected to said piston and driving a load,
a fuel injection system connected to said cylinder and having a fuel injection pump,
the improvement comprising,
means for detecting peak cylinder pressure inside of said cylinder and generating a pressure signal proportional to said pressure,
means for measuring the speed of said crankshaft and generating an output signal proportional to crankshaft speed,
means for measuring said load on said engine and generating an output signal proportional to said engine load,
a comparator having a first input side, a second input side, a third input side and an output side,
the output side of said means for detecting peak pressure connected to said first input side of said comparator,
the output side of said means for measuring crankshaft speed connected to said second input side of said comparator,
the output side of said means for measuring engine load connected to said third input side of said comparator, and
means connected to said output side of said comparator for adjusting the timing of said injection pump to achieve constant volume combustion.

6. The apparatus as claimed in claim 5 further comprising
means for detecting and measuring engine speed and generating an output signal proportional to engine speed, said means electrically connected to said means for adjusting the timing of said fuel injection pump.

7. The apparatus as claimed in claim 5 further comprising
means for detecting and measuring engine load and producing an output signal proportional to engine load, said means electrically connected to said means for adjusting the timing of said fuel injection pump.

8. The apparatus as claimed in claim 5 wherein said fuel injection pump comprises
an operating arm adapted to adjust the position of injection of fuel relative to crankshaft position, and
wherein said means for adjusting the timing of said fuel injection pump comprises
a control unit,
an hydraulic piston adapted to engage said operating arm of said fuel injection pump and move said operating arm between two positions,
an hydraulic pump having a high pressure side and a low pressure side, said high pressure side in fluid communication with said hydraulic piston, and
an electrically actuated spill valve electrically connected to said control unit,
said spill valve having an inlet port and an outlet port, said inlet port in fluid communication with said high pressure side of said pump, and said outlet port of said spill valve in fluid communication with said low pressure side of said pump.

9. The apparatus as claimed in claim 8 wherein said spill valve comprises
a valve seat,
a valve plug, and
an electroexpansive member connected to said valve plug and adapted to vary the distance between said valve plug and said valve seat.

10. In a diesel internal combustion engine comprising
means defining a cylinder having a cylinder head,
a piston disposed in said cylinder and adapted to slidably move toward and away from said cylinder,
a crankshaft connected to said piston and connected to a load,
a fuel injection system having a fuel injection pump in fluid communication with said cylinder,
the improvement comprising,
means for detecting peak pressure inside said cylinder and generating a cylinder pressure signal proportional to said pressure,
means for measuring crankshaft timing relative to a reference position on said crankshaft when said peak pressure signal is detected and generating an actual crankshaft timing signal when said peak pressure signal is detected,
means for measuring engine speed and producing an engine speed signal,
means for measuring engine load and generating an engine load signal,
means for comparing said engine speed signal and said engine load signal and producing an optimum crankshaft timing signal,
means for comparing said actual crankshaft timing signal with said optimum crankshaft timing signal and generating a timing adjustment signal, and
means for adjusting the timing position of said fuel injection pump in accordance with said timing adjustment signal to achieve optimized efficiency combustion.

11. A method of achieving optimized efficiency combustion in a diesel internal combustion engine comprising the steps of
continuously sensing peak cylinder pressure to generate a peak pressure signal,
comparing the peak pressure position with crankshaft position and generating an actual crankshaft timing position signal,
continuously sensing engine speed and generating an engine speed signal,
continuously sensing engine load and generating an engine load signal,
comparing said engine speed signal with the engine speed parameter of an engine speed-load-timing map,
comparing said engine load signal with the engine load parameter of said engine speed-load-timing map,
generating an optimum crankshaft timing signal in accordance with the timing parameter at the intersection of the load signal coordinate and the speed signal coordinate of said speed-load-timing map,
comparing said actual crankshaft timing signal with said optimum crankshaft timing signal to generate a crankshaft timing error signal, and
adjusting the fuel injection timing to reduce the difference between actual crankshaft timing and optimum crankshaft timing signals.

12. The method of achieving optimized efficiency combustion in a diesel cycle internal combustion engine as claimed in claim 11 wherein the step of comparing the peak cylinder pressure position with crankshaft position comprises continuously measuring an index position on said crankshaft and generating an index pulse, generating a plurality of timing pulses having a predetermined fixed frequency, counting the number of timing pulses after the index pulse and stopping the counting of the timing pulses when the peak pressure is reached to generate an actual crankshaft timing position signal.

13. A method of achieving optimized efficiency combustion in a diesel internal combustion engine comprising the steps of continuously sensing peak cylinder pressure to generate a peak pressure signal, differentiating said pressure signal to generate a control signal that changes from positive to negative polarity when peak pressure is reached, comparing the peak pressure position with crankshaft position and generating an actual crankshaft angle position signal, continuously sensing engine speed and generating an engine speed signal, continuously sensing engine load and generating an engine load signal, comparing said engine speed signal with the engine speed parameter of an engine speed-load-crankshaft angle map, comparing said engine load signal with the engine load parameter of said engine speed-load-crankshaft angle map, generating an optimum crankshaft angle signal in accordance with the angle parameter at the intersection of the load signal coordinate and the speed signal coordinate of said speed-load-crankshaft angle map, comparing said actual crankshaft angle position signal with said optimum crankshaft angle signal to generate a crankshaft angle error signal, and adjusting the fuel injection timing to reduce the difference between actual crankshaft angle and optimum crankshaft angle signals to zero.

* * * * *